(12) United States Patent
Burmeister

(10) Patent No.: US 9,601,796 B2
(45) Date of Patent: Mar. 21, 2017

(54) FUEL CELL ARRANGEMENT

(76) Inventor: Uwe Burmeister, Munich (DE)

( * ) Notice: Subject to any disclaimer, the term of this patent is extended or adjusted under 35 U.S.C. 154(b) by 1163 days.

(21) Appl. No.: 13/576,861

(22) PCT Filed: Jan. 27, 2011

(86) PCT No.: PCT/EP2011/000370
§ 371 (c)(1),
(2), (4) Date: Oct. 16, 2012

(87) PCT Pub. No.: WO2011/095301
PCT Pub. Date: Aug. 11, 2011

(65) Prior Publication Data
US 2013/0029243 A1 Jan. 31, 2013

(30) Foreign Application Priority Data
Feb. 2, 2010 (DE) .................. 10 2010 006 705

(51) Int. Cl.
| H01M 2/08 | (2006.01) |
| H01M 8/04 | (2016.01) |
| H01M 8/24 | (2016.01) |
| H01M 8/12 | (2016.01) |
| H01M 8/14 | (2006.01) |

(52) U.S. Cl.
CPC .......... *H01M 8/247* (2013.01); *H01M 8/2475* (2013.01); *H01M 2008/1293* (2013.01); *H01M 2008/147* (2013.01); *Y02E 60/50* (2013.01); *Y02E 60/525* (2013.01); *Y02E 60/526* (2013.01)

(58) Field of Classification Search
None
See application file for complete search history.

(56) References Cited

U.S. PATENT DOCUMENTS

| 2004/0003800 A1* | 1/2004 | Gschwind et al. ........... 123/549 |
| 2005/0277012 A1* | 12/2005 | Inagaki ........................ 429/37 |
| 2008/0182151 A1* | 7/2008 | Mizusaki et al. ............. 429/34 |

FOREIGN PATENT DOCUMENTS

| DE | 10 2004 035168 A1 | 2/2006 |
| DE | 10 2007 021018 A1 | 11/2008 |
| JP | 2008 066127 A | 3/2008 |

OTHER PUBLICATIONS

PCT International Search Report for PCT/EP2011/000370 dated May 13, 2011.

\* cited by examiner

*Primary Examiner* — Barbara Gilliam
*Assistant Examiner* — Adam A Arciero
(74) *Attorney, Agent, or Firm* — Fishman Stewart PLLC; Paul M. Ratzmann

(57) ABSTRACT

A fuel cell arrangement is disclosed. The fuel cell arrangement includes a fuel cell stack and a housing wall element to form a housing surrounding the fuel cell stack. The housing wall element comprises a penetrating opening for an electric contacting of the fuel cell stack via a conductor. The conductor extends through the penetrating opening. A sheath is arranged between the penetrating opening wall and the conductor around an insulation layer arranged at the conductor. The sheath, together with the insulation layer, is pushed against the conductor in a gas-tight fashion, with the penetrating opening being sealed in a gas-tight fashion via a compensation element to compensate for longitudinal and lateral movements. The compensation element is lastingly fastened at the sheath element and the housing wall element in a gas-tight fashion.

11 Claims, 1 Drawing Sheet

FUEL CELL ARRANGEMENT

CROSS REFERENCE TO RELATED APPLICATIONS

This application is a National Phase Application related to PCT/EP2011/00370 filed on Jan. 27, 2011, which application claims priority to DE 2010 006 705.9 filed on Feb. 2, 2010, which applications are incorporated herein by reference in their entirety.

TECHNICAL FIELD

The present disclosure relates to a fuel cell arrangement.

BACKGROUND

Fuel cell arrangements of the present type are known, e.g., from the publication WO 02/078107 A2 or the publication DE 195 17 042 C2. Such fuel cell arrangements comprise one or more fuel cells, which in the case of several fuel cells are clamped together to form a fuel cell stack, for example. In order to electrically contact a fuel cell stack, in which the fuel cells are switched serially, for example, pins and/or electric connectors are guided, for example, through a usually thermally insulating housing surrounding the fuel cell stack and insulating it, for example, from the exterior atmosphere and contact fuel cells in a suitable fashion, for example, via a wire or cable connection, as shown in DE 195 17 042 C2.

In high-temperature fuel cells, in which the fuel cell stack is regularly deformed and/or moved due to chemical or thermal processes due to the high temperature the electric contacts are connected to the fuel cell without any mobile lines (see, e.g., the publication DE 197 81 422 C1, which shows an electrolyzer) so that the pins and/or the electric connectors move together with the fuel cell stack, i.e., in reference to the housing. Here, the problem of a suitable sealing for the guidance of the electric contacts through said housing always arises.

SUMMARY

A fuel cell arrangement is disclosed herein, which, even in case of relative motions of the power connector and the housing, allows a gas-tight and electrically insulated passage of an electric connector through a housing in a simple fashion with easy assembly and low costs.

According to the disclosure, a fuel cell arrangement is suggested, comprising a fuel cell stack as well as a housing wall element to form a housing surrounding a fuel cell stack. The housing wall element comprises a penetrating opening to electrically contact the fuel cell stack via a conductor, with a conductor extending through the penetrating opening. A sheath is arranged between the penetrating opening wall and the conductor around an insulating layer arranged at the conductor. The sheath is pressed together with the insulating layer against the conductor in a gas-tight fashion, with the penetrating opening being sealed in a gas-tight fashion via a compensation element to compensate for longitudinal and lateral motions. The compensation element is lastingly fastened at the sheath element and the housing wall element in a gas-tight fashion.

In an embodiment of the fuel cell arrangement according to the disclosure, the compensation element is fastened via a fastening element to the housing wall element, particularly at an exterior of the housing wall element.

In another exemplary fuel cell arrangement according to the disclosure, the compensation element is fastened via a fastening element in the form of a flange element. In one exemplary configuration, the flange element is a circular flange at the housing wall element.

In another exemplary embodiment of the fuel cell arrangement according to the disclosure, the flange element is screwed to the housing wall element, particularly at an exterior of the housing wall element.

According to one aspect of the fuel cell arrangement according to the disclosure, the compensation element is embodied as a spring element and/or as a bellows. In one exemplary arrangement, the bellows is embodied as metallic bellows.

Furthermore, according to the disclosure, a fuel cell arrangement is suggested, with the compensation element extending along the sheath, with the sheath forming a collar and/or a circumferential projection for a gas-tight support and/or fastening of an end of the compensation element at the fuel cell side.

In another aspect of the fuel cell arrangement according to the disclosure, an end of the compensation element is provided for fastening at the housing wall element, formed integrally with a fastening element.

In one embodiment of the fuel cell arrangement according to the disclosure, the insulating layer is embodied as a sheath.

Furthermore, according to an embodiment of the disclosure, a fuel cell arrangement is suggested, with the insulating layer being made from micanite.

According to an embodiment of the disclosure, a fuel cell arrangement is suggested as well, with the housing wall element comprising a thermal insulation extending through the penetrating opening.

In another embodiment of the fuel cell arrangement according to the disclosure, the sheath is pressed via a pre-stressing element against the insulating layer and against the conductor in a lastingly gas-tight fashion.

In another embodiment according to the fuel cell arrangement according to the disclosure, the pre-stressing element is embodied as a bracket.

Additional features and advantages of the disclosure are discernible from the following description of exemplary embodiments, based on the figures of the drawings, which show details essential for the disclosure, as well as the claims. The individual features may each be embodied individually or jointly in any combination to form a variant of the disclosure.

BRIEF DESCRIPTION OF THE DRAWINGS

In the following, exemplary embodiments of the disclosure are explained in greater detail based on the attached drawings.

DETAILED DESCRIPTION

Figure 1:
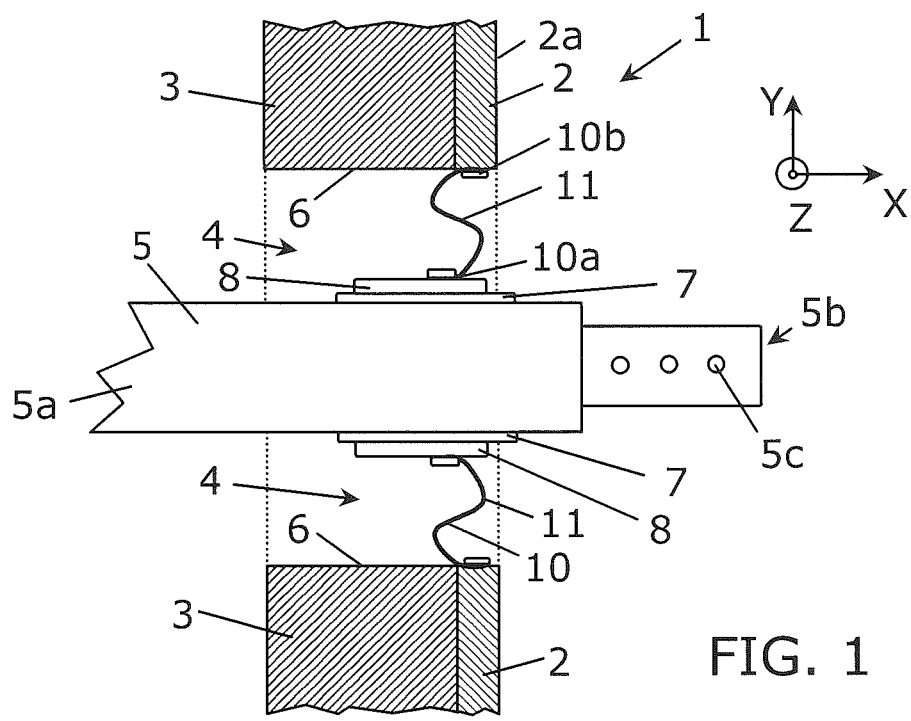
FIG. 1 exemplarily illustrates a fuel cell arrangement in a cross section through a housing wall element according to one possible embodiment of the disclosure.

In the following description and the drawings identical elements or those with a comparable function are marked with the same reference character.

FIG. 1 shows as an example a fuel cell arrangement 1 according to the disclosure in a cross section through a housing wall element 2 (sectioned in the X-direction). As may be seen, the fuel cell arrangement comprises at least one fuel cell to be electrically contacted, for example, representing a part of a fuel cell stack (not shown). The fuel cell may here be embodied for a lateral or facial contacting, for example. The fuel cell stack shows an end plate each at the facial sides, for example, by which it can be clamped, for example, in a manner known per se.

The fuel cell arrangement 1 comprises a housing wall element 2, which is provided to form a housing, which surrounds and/or encompasses the fuel cell stack in order to seal it, e.g., from the exterior atmosphere and to thermally insulate it, for example. For this purpose, the housing wall element 2, which is embodied, for example, as a housing cover, e.g., as a facial housing cover to be arranged essentially planar and parallel in reference to an end plate, can comprise, e.g., a thermal sealing and/or insulation 3 formed in a manner known per se and pointing in the direction of the fuel cell (e.g., in FIGS. 1, 2 towards the left).

For an electric contacting of a fuel cell through the housing wall element 2, the housing wall element 2 as well as, for example, the insulation 3 comprise a penetration and/or a penetrating opening 4, which is embodied, e.g., as a bore hole and, e.g., formed tubular with a circular cross section or a different cross section. The penetrating opening 4 makes it possible to guide a conductor 5 and/or an electric connector through the housing wall element 2. For the purpose of contacting, the penetrating opening 4 is formed in the housing wall element 2 at a suitable location, e.g., opposite the contacting site provided at the fuel cell.

For contacting, furthermore an electric contact, particularly a (torque-proof) stiff and/or rigid electric contact is provided in the form of, e.g., an electrically conducting pin or a rod, e.g., essentially a round rod, with an oblong extension, in the following called conductor 5. The conductor 5 extends, according to the disclosure, through the penetrating opening 4 and is, e.g., connected to an end 5a at the fuel cell side with a fuel cell to be contacted inside the housing to be formed (directly or indirectly). The opposite end 5b (exterior end) is, e.g., provided to connect an electrified line, e.g., a cable, and projects, e.g., the housing wall element 3 towards the outside (X-direction), thus extends beyond the (longitudinal) dimensions of the penetrating opening 4. The end 5b comprises, e.g., bore holes 5c for a connection to a supply line in order to generate an electric connection or another suitable fastening means for contacting a supply line at the conductor 5.

According to the disclosure, it is proposed to fasten an insulating layer 7 for an electric insulation at the conductor 5 between the conductor 5 and the wall of the penetrating opening 4 pointing to the conductor 5 and/or the penetrating opening wall 6 in order to realize a potential separation between, e.g., the conductor 5 and the housing wall element 2. The insulating layer 7 is, e.g., formed as a paste-like curing insulating layer, embodied as a wound insulating layer, a web material, or in another fashion around the conductor 5, particularly around its entire circumference. In the present case, the insulating layer 7 is embodied, e.g., as an (insulating) sheath, which can be pushed and/or plugged onto the conductor 5. The insulating layer 7 may be produced, e.g., in the form of a sheath, for example, comprising ceramics, or any suitable material, in the present case, for example, from micanite.

The insulating layer 7 is surrounded, according to the disclosure, by (another) sheath element and/or a sheath 8, e.g., a tubular sheath with, e.g., an interior cross section adjusted to the conductor 5 and the insulating layer 7 arranged around it such that the sheath 8, for example, embodied as a clamping sheath for clamping, is not contacting the conductor 5, for example, to allow the desired potential separation. In order to arrange the sheath 8 around the insulating layer 7 the sheath 8 comprises, for example, an interior diameter which allows a plugging on and/or an arrangement by, e.g., laterally pushing the exterior end 5b of the conductor 5. The sheath 8 may be arranged, e.g., via a press-fit (FIG. 1) at the insulating layer 7 or, e.g., be slotted, in order to allow at least partially a facilitated plugging on and a subsequent clamping.

In the present case, it is provided according to the disclosure, to arrange a sheath 8 around the insulating layer 7 and/or a sheath slotted in the direction towards the exterior end 5b (over a part of its length) in order to subsequently fixate and/or clamp it via a clamping element 9 (FIG. 2), e.g., in the form of an integral or separately formed annual bracket and thus to push the sheath 8 lastingly against the insulating layer 7 and/or the conductor 5. The clamping element 9, which may be clamped, e.g., via a nuts-and-bolts connection, is here arranged, e.g., outside the housing wall element 2 (longitudinal direction X) at the (clamping) sheath 8 in order to ensure access from the outside and an easy assembly. According to the disclosure it is provided to form the arrangement of the insulation layer 7 and the sheath 8 at the conductor 5 such that gas-tightness is achieved in the longitudinal direction between the conductor 5 and the sheath 8. This way it be achieved that the sheath 8 and the insulating layer 7 are pushed accordingly against the conductor 5.

In order to seal the penetrating opening 4, according to the disclosure, around the conductor 5 in a gas-tight fashion and still allow the conductor 5 to be mobile inside thereof (X-, −Y, and Z-direction), it is provided to lastingly arrange a compensation element 10 for a gas-tight sealing of the opening remaining between the sheath 8 and the penetrating opening wall 6, which allows in the unsealed condition a fluid communication between the interior of the housing and the exterior of the housing. The compensation element 10, embodied, e.g., as a spring element 11 and, e.g., in the form of a spring and/or annular disk with an, e.g., S-shaped cross section (FIG. 1) or as a bellows element (FIG. 2), in the present case, e.g., as a bellows 12 and particularly as a metallic bellows, makes it possible to compensate motions of the conductor 5 in the longitudinal direction X and in the lateral direction (Y, Z) and thus a relative motion of the conductor 5 in reference to the housing wall element 2.

For a gas-tight sealing, according to the disclosure, of the opening remaining around the sheath 8, the compensation element 10 is arranged entirely around the sheath 8 such that the opening is sealed and in connection to the sheath 8 in a gas-tight and lasting fashion (Y-, Z-direction). For this purpose, fastening methods of prior art may be used, e.g., force-fitting, substance-to-substance, or form-fitting methods, or combinations thereof, which allow such a fastening. In the present case the compensation element 10 may be welded, e.g., to the sheath 8 (FIG. 2), e.g., via a first end 10a. The compensation element 10 is further fastened at the housing wall element 2 in a lasting and gas-tight fashion, e.g., via a fastening method of prior art as stated above, e.g., via a second end 10b. It is possible to support the sealing, e.g., via a sealant at the housing wall element 2 or at the sheath 8.

According to the disclosure, for the fastening of the first end 10a at the sheath 8 and/or the second end 10b of the compensation element 10 at the housing wall element 2, e.g., one fastening element (each) and/or the above-stated fastening methods may be used. It is provided, e.g., to support the first end 10a at a collar 13 (FIG. 2), formed particularly integrally with the sheath 8, and the first end 10a fastened thereat, e.g., via welding in a lastingly gas-tight fashion. In order to fasten the second end 10b, which is distanced from the first end 10a, e.g., in the longitudinal direction, at the housing wall element 2 it is provided, e.g., to form the compensation element 10 integrally with a fastening element 15, particularly a flange element 14 (FIG. 2), which can be fastened, e.g., at the exterior 2a of the housing wall element around the penetrating opening 4 in a gas-tight fashion, e.g., via a screw connection.

Figure 2:
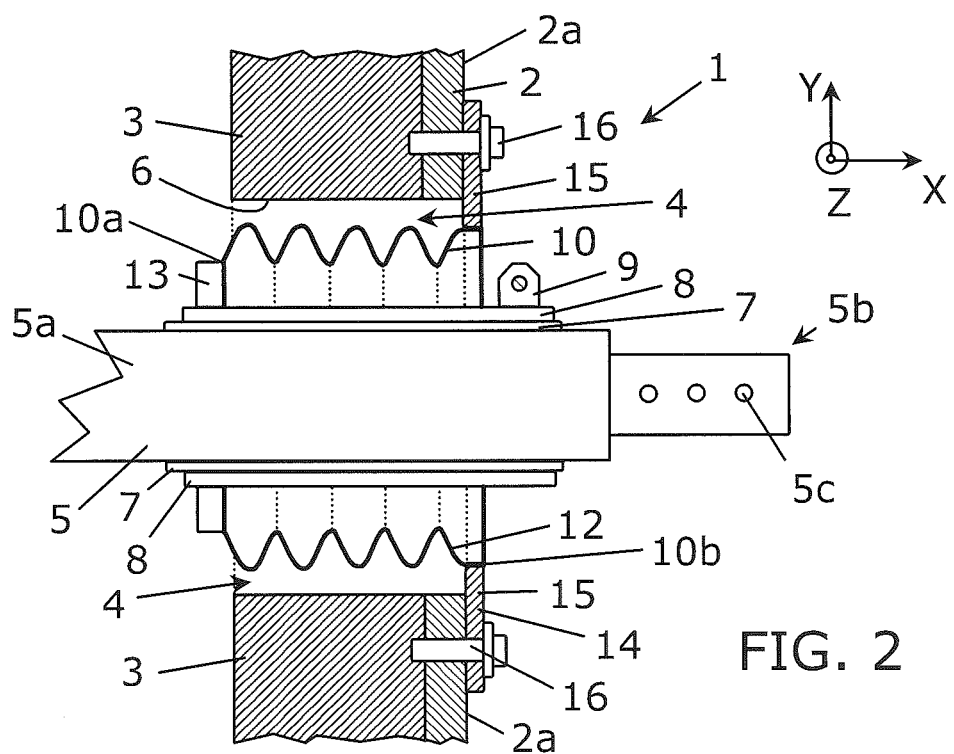
FIG. 2 exemplarily a fuel cell arrangement in a cross section through a housing wall element according to another potential embodiment of the disclosure.

For the fastening of the compensation element 10 of FIG. 2 in the form of a bellows 12, it is provided to arrange the bellows 12, extending corrugated with alternating diameters along the sheath 8, e.g., from the collar and/or annular projection 13 to, e.g., the exterior 2a of the housing wall element at a distance (in the Y-, Z-direction) from the penetrating opening wall 6 of the penetrating opening 4 so that a freedom of movement of the conductor 5 due to expected relative motions is not compromised by the bellows 12 contacting the penetrating opening wall 6. For the same purpose, the bellows 12 comprises, e.g., at its end 10b facing away from the fuel cell an open end and/or is hollow in its interior so that the conductor 5 inside the bellows 12 can move freely to the extent necessary with simultaneous gas-tightness.

For the assembly of the fuel cell arrangement 1 according to the disclosure, e.g., first the housing wall element 2 is placed over the exterior end 5a of the conductor 5, with the conductor 5 passing through the penetrating opening 4. Subsequently, or even beforehand, the insulating layer 7 can be applied on the conductor 5, in case of an insulating sheath 7, e.g., by way of plugging on from the exterior end 5b. Now, a particularly pre-assembled component comprising, e.g., a sheath 8, a compensation element 10, and, e.g., a clamping element 9 can be placed onto the insulating layer 7, e.g., pushed thereon. For this purpose the component is inserted into the penetrating opening 4 from the exterior 2a of the housing wall element and, e.g., clamped and/or pressed via the clamping element 9 against the insulating layer 7 and the conductor 5, e.g., by way of screwing. Then the penetrating opening 4 around the conductor 5 can be sealed in a gas-tight fashion via, e.g., fastening elements 15, e.g., in the form of the flange element 14 formed integrally with the compensation element 10, as well as the screws 16 and bore holes in the housing wall element 2.

The invention claimed is:

1. A fuel cell arrangement comprising a fuel cell stack and a housing wall element to form a housing surrounding the fuel cell stack, with the housing wall element comprising a penetrating opening for an electric contacting of the fuel cell stack via a conductor, with the conductor extending through the penetrating opening, wherein a sheath is arranged between the penetrating opening of the housing wall element and the conductor around an insulating layer arranged at the conductor, wherein the sheath is pushed together with the insulating layer against the conductor in a gas-tight fashion, with the penetrating opening being sealed in a gas-tight fashion via a compensation element to compensate for longitudinal and lateral motions, with the compensation element being fastened in a gas-tight fashion at the sheath and at the housing wall element, wherein the compensation element is embodied as one of a spring element and a bellows.

2. The fuel cell arrangement according to claim 1, wherein the compensation element is fastened via a fastening element at an exterior of the housing wall element.

3. The fuel cell arrangement according to claim 2, wherein the compensation element is fastened via the fastening element in the form of an annular flange element at the housing wall element.

4. The fuel cell arrangement according to claim 3, wherein the flange element is screwed to an exterior of the housing wall element.

5. The fuel cell arrangement according to claim 1, wherein the compensation element extends along the sheath, with the sheath forming a collar for a gas-tight support and/or fastening of an end of the compensation element facing the fuel cells.

6. The fuel cell arrangement according to claim 1, wherein one end of the compensation element provided for fastening at the housing wall element is formed integrally with a fastening element.

7. The fuel cell arrangement according to claim 1, wherein the insulating layer is embodied as a sheath.

8. The fuel cell arrangement according to claim 1, wherein the insulating layer is formed from micanite.

9. The fuel cell arrangement according to claim 1, wherein the housing wall element comprises a thermal insulation with the penetrating opening extending through it.

10. The fuel cell arrangement according to claim 1, wherein the sheath is lastingly pushed via a clamping element against the insulating layer and against the conductor in a gas-tight fashion.

11. The fuel cell arrangement according to claim 10, wherein the clamping element is embodied as a bracket.

* * * * *